Figure 8:
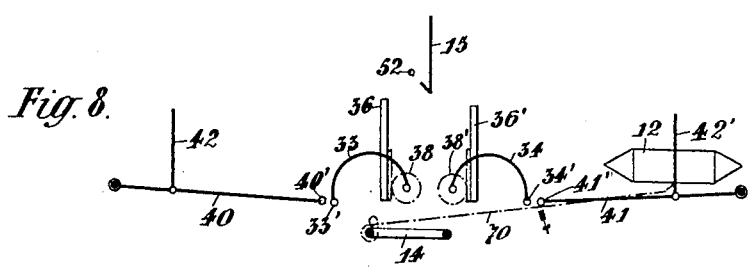

A. DANGL.
MACHINE FOR COVERING RINGS WITH THREADS, ESPECIALLY FOR MAKING THREAD BUTTONS.
APPLICATION FILED APR. 17, 1915.
1,396,626.
Patented Nov. 8, 1921.
7 SHEETS—SHEET 1.
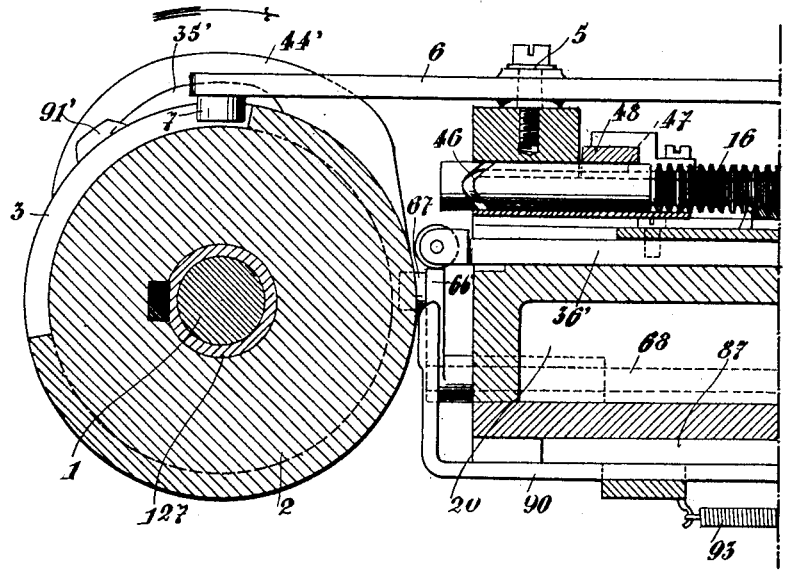
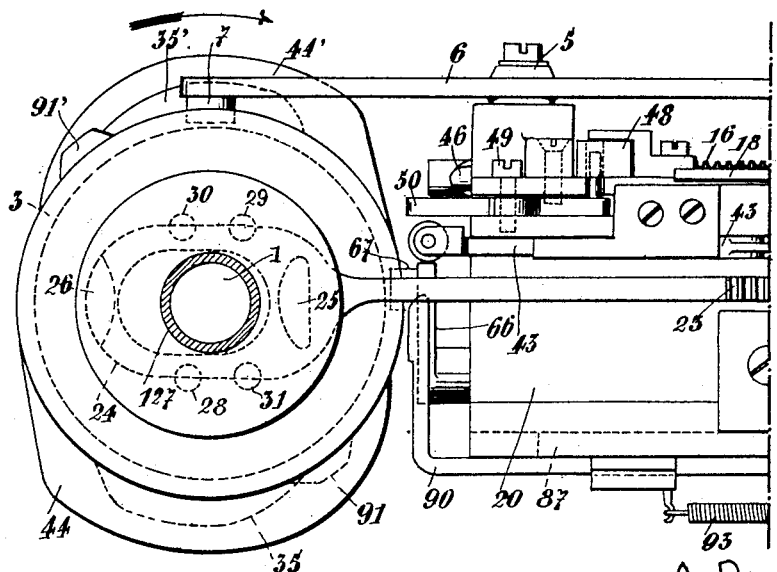
Witnesses:—
M. M. Border
H. R. Kerslake
A. Dangl
Inventor.
By Croydon Marks
Attorney.

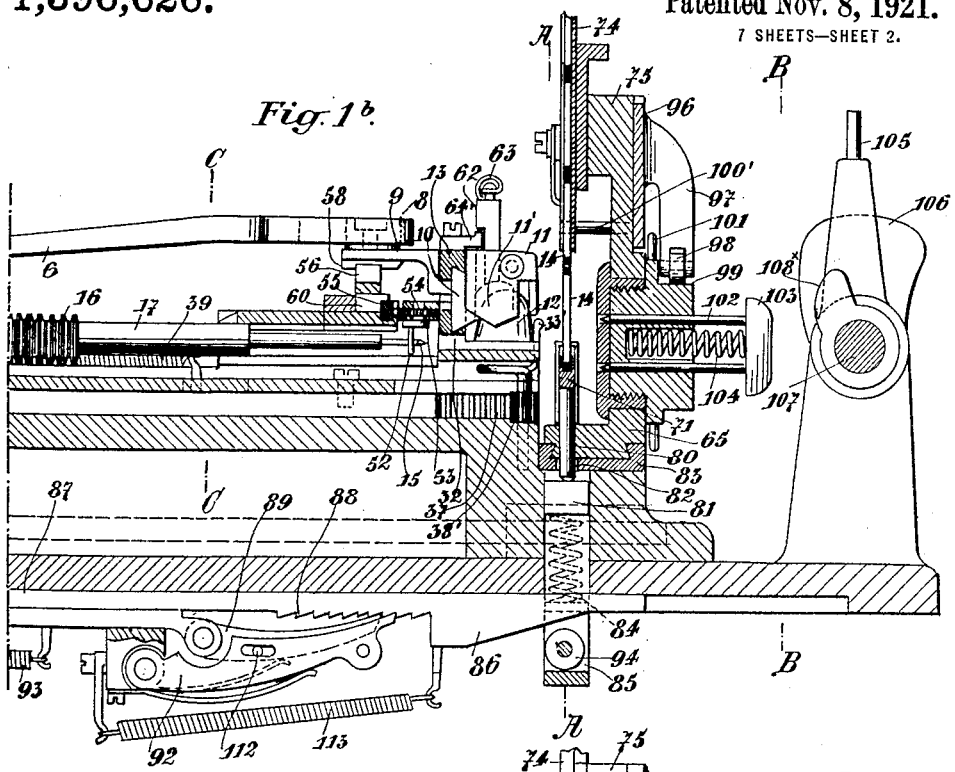

A. DANGL.
MACHINE FOR COVERING RINGS WITH THREADS, ESPECIALLY FOR MAKING THREAD BUTTONS.
APPLICATION FILED APR. 17, 1915.
1,396,626.
Patented Nov. 8, 1921.
7 SHEETS—SHEET 3.
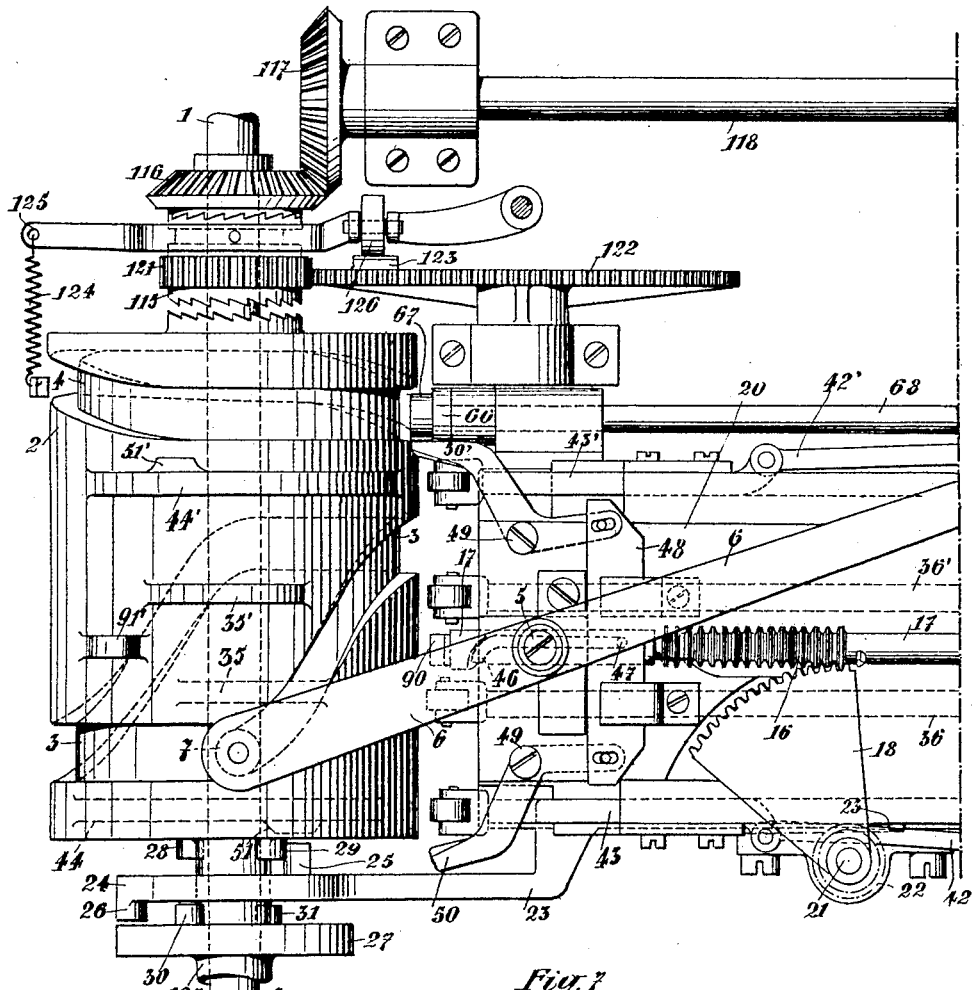
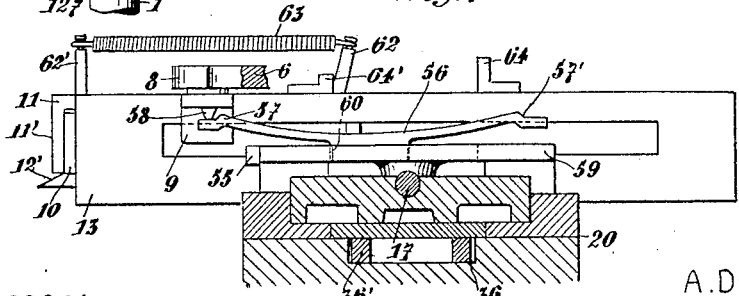
Witnesses:—
M. M. Border.
H. R. Kerslake.
A. Dangl
Inventor.
Attorney.

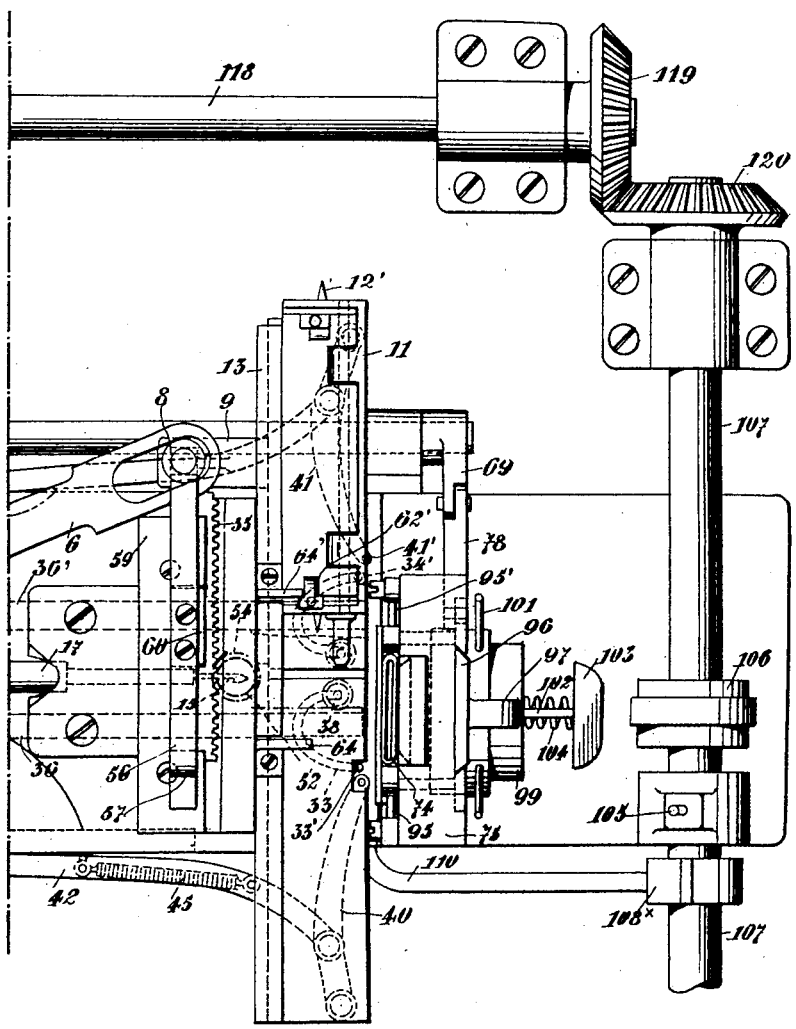

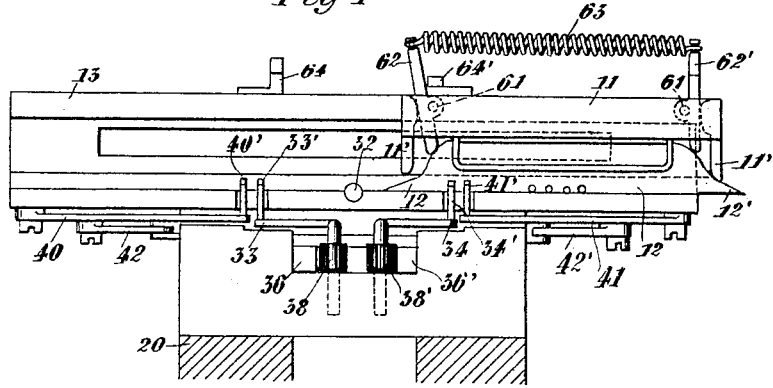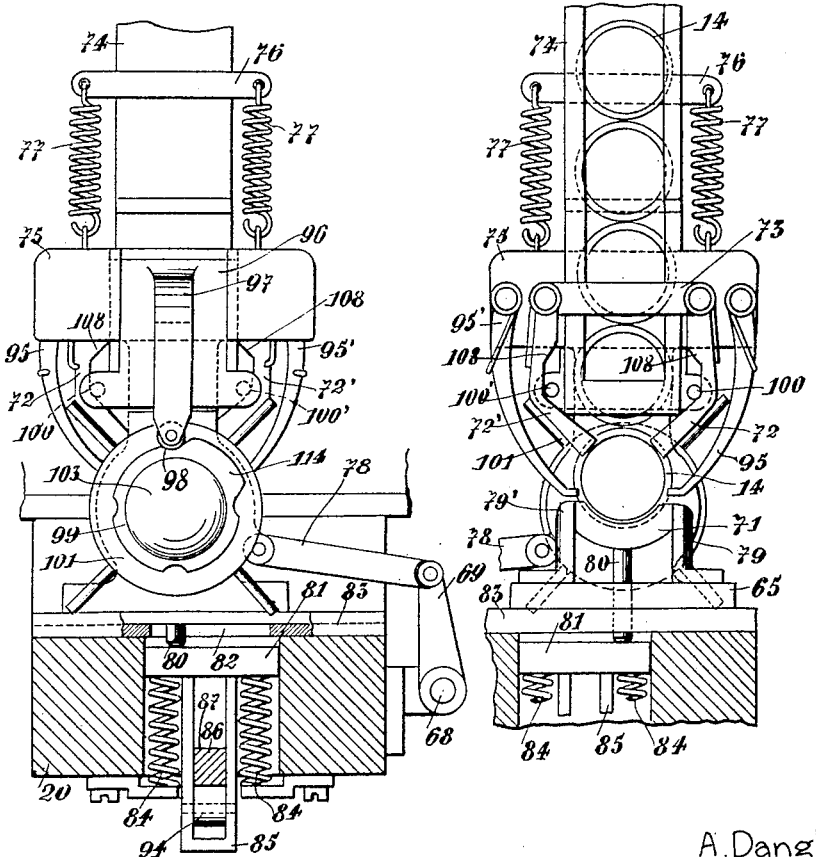

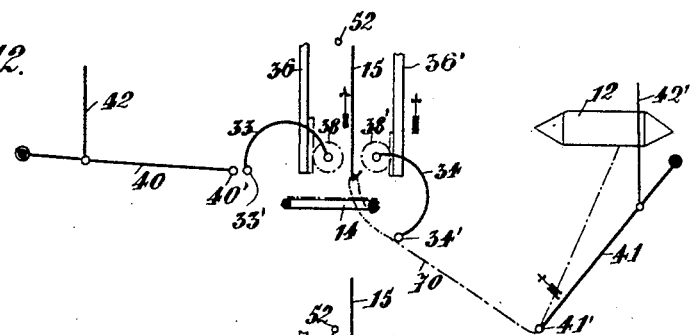
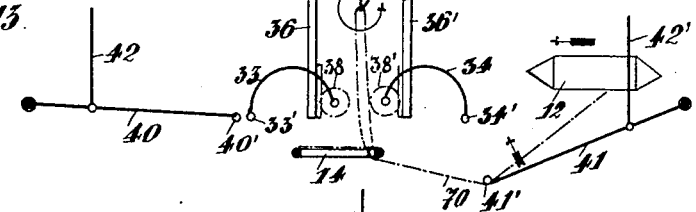
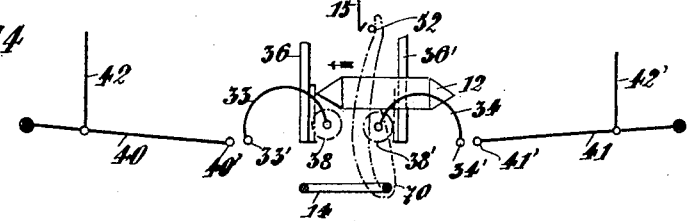
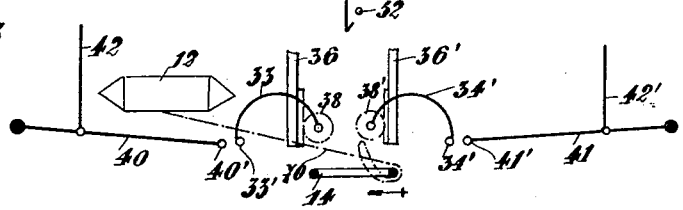
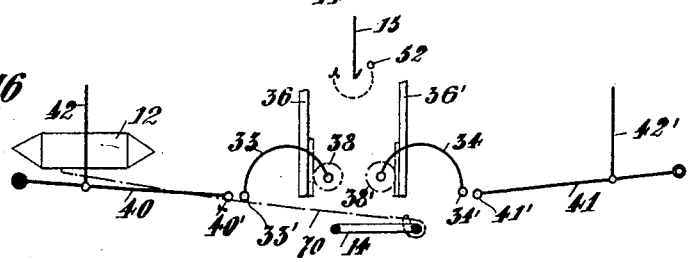

UNITED STATES PATENT OFFICE.

ADOLF DANGL, OF VIENNA, AUSTRIA.

MACHINE FOR COVERING RINGS WITH THREADS, ESPECIALLY FOR MAKING THREAD-BUTTONS.

1,396,626.    Specification of Letters Patent.    Patented Nov. 8, 1921.

Application filed April 17, 1915. Serial No. 22,025.

(GRANTED UNDER THE PROVISIONS OF THE ACT OF MARCH 3, 1921, 41 STAT. L., 1313.)

*To all whom it may concern:*

Be it known that I, ADOLF DANGL, residing at 25 Lowengasse, Vienna, III, Austria, have invented certain new and useful Improvements in Machines for Covering Rings with Threads, Especially for Making Thread-Buttons, of which the following is a specification.

The invention relates to a machine for sewing or spinning around rings, especially around wire-rings for thread-buttons, with a single-thread stitch which cannot become loose, having a hooked needle and a coöperating reciprocating shuttle.

With the known machines of this kind the sewing is done in such a manner, that the running thread is laid around the ring-body to form a loop and, subsequently, is led through this loop, for the purpose of closing it. This is done because the loop which is formed by the thread stretched across the opening of the ring is made on that side of the ring which is away from the track of the shuttle, so that the loop must be brought back into the range of the shuttle.

The surrounding of the ring-body by the loop was done in such a manner, that the loop which was drawn out by the crochet-needle was taken up by a gripper, swinging in the range of the needle and shuttle, laid outward over the ring-body and returned to the shuttle-track, whereupon the thread of the shuttle was led through the loop, or, the loop was seized by a second hook of the needle, which was formed as a double-needle, and, after a lateral movement of the ring, was pulled on the outside of the latter into the track of the shuttle, for the purpose of locking.

Contrary to these known machines, in the machine which is the subject of this invention, the loop is formed toward the track of the shuttle, so that the latter can be led directly through the loop in order to close it. The loop is not laid around the ring-body, but is tied at the point where it is formed, while the thread is put around the ring-body, when the shuttle is traveling through the loop. For this purpose the crochet-needle is arranged on the side of the ring which is facing the track of the shuttle. However, in order to obtain, on the opposite side of the ring, a layer of thread which is stretched across part or the whole of the opening of the ring, for the purpose of forming the loop, the thread which is pulled out by the thread-stretcher is seized by a thread laying device and pulled around the outer edge of the ring, on the side of the latter which is away from the crochet-needle, across the opening of the ring into the range of the hooked needle which, subsequently, while passing through the opening of the ring, seizes the thread and pulls it, forming a loop, toward the shuttle into the range thereof, whereupon the shuttle passes through the loop for the purpose of locking it. If the opening of the ring, for the purpose of making thread-buttons, is to be covered with layers of thread, arranged radially, the thread is pulled by two thread-laying devices, arranged with the ring edge-wise between them, alternately on one and the other side away from the edge across the opening of the ring, and by the needle, in form of a loop, into the reach of the shuttle, by the reciprocating movement of which the layers covering the opening of the ring are formed, which layers of thread, are fastened, alternately at opposite points on the ring, where the loop was formed, by closing the loops after passing through them.

A machine, of this kind, for manufacturing thread-buttons is, for instance, shown in longitudinal section in Figures 1ª and 1ᵇ; in side-elevation in Figs. 2ª and 2ᵇ and in plan in Figs. 3ª and 3ᵇ. Figs. 4 and 5 are vertical sections taken on the lines A—A and B—B of Fig. 1ᵇ, looking from the right hand side, while Fig. 6 is a similar section taken on the line A—A, but looking from the left hand side. Fig. 7 shows a vertical section taken on the line C—C of Fig. 1ᵇ, while Figs. 8 to 16 illustrate various steps in the operation of the machine.

The machine which is especially designed for making thread-buttons with the threads laid in the chord of a circle is constructed as follows:

Mounted on the main shaft 1 which may be driven by a belt, is a cam-roller 2 with two cam-grooves 3 and 4, the former engaged by roller 7 carried by a rocking lever 6 pivoted at 5. The other end of the lever 6 is provided with a slot which is engaged by a roller 8 on an arm 9, the latter projecting from a sliding body 10, which forms one piece with the support 11 of the shuttle 12 and is guided in a dove-tailed guide-way formed in a rail 13. Therefore, by rotating the cam-roller 2, the shuttle 12 is reciprocated by the rocking lever 6, and in this movement the shuttle passes by the ring 14 which is held in a holding device. On the same side of the ring on which the guide rail 13 is arranged, is located the crochet-needle 15 which, in its forward-movement, passes through the opening of the ring. The reciprocating movement of the needle 15, in the construction shown, is effected by a toothed sector 18 which engages peripheral teeth 16 on the needle spindle 17. The toothed sector 18 is mounted on a short shaft 21 which is arranged vertically on the frame 20, the shaft 21 carrying a toothed gear 22, meshing with a rack 23, the slotted end 24 of which embraces the driving shaft 1. The slotted end 24 has on opposite sides thereof projecting lugs 25 and 26, which are arranged, in the longitudinal direction of the rack 23, on diametrically opposite sides of the shaft 1. The lugs 25, 26 are alternately engaged by pins 28, 29, and 30, 31 respectively, the pins 28, 29 being arranged on the end face of the cam-roller 2 and the pins 30, 31 being arranged on the face of a disk 27 which is rigidly connected with the drum, thereby effecting the reciprocating movement of the rack 23 and of the needle 15, actuated thereby. As during one revolution of the cam-roller 2, which effects the reciprocating movement of the shuttle, two loops must be pulled out of the shuttle-thread, the needle 15 during this time, is twice moved toward and away from the ring 14 for the purpose of forming the loops, one rotation of the cam-roller in the direction of arrow (Fig. 2ᵃ) causing a forward movement of rack 23 by the engagement of pin 29 with lug 25, and a backward movement by engagement of pin 31, with lug 26, then a second forward movement by the engagement of pin 28 with lug 25 and a second backward movement by the engagement of pin 30 with lug 26. These movements of the needle 15 occur while the shuttle is held stationary at opposite ends of its movement by the straight end portions of the groove 3, said groove being so formed that the shuttle is moved from one end to the other movement during the first quarter-revolution of the cam-roller and is held stationary during the next quarter-revolution, during which time the pins 29 and 31 come into operation. During the next quarter-revolution of the drum the shuttle is returned to the other end of its movement, where it is held stationary during the last quarter-revolution of the drum, during which time the pins 28 and 30 are brought into action. The needle 15, passes during each forward-movement through an opening 32 (Figs. 1ᵇ and 4) of the guide rail 13 immediately under the track on which the shuttle 12 moves, and passes through the opening of the ring 14, located in front of the shuttle track, this movement being made so that the needle can seize the shuttle-thread which is laid on the opposite sides of the ring, crossing the opening thereof, for the purpose of forming the loop. The laying of the thread is effected by two thread-laying devices which are arranged with the ring edgewise between them, co-operating each with a thread-stretcher. The thread-laying devices comprise swinging arms 33 and 34 which are arranged beneath the shuttle track, and which, while turning, engage the thread with their upwardly extending ends 33′ and 34′ and lay it around the outer rim of the ring and in a loop back of the opening of the ring. The rotary movement of the thread-laying arms 33 and 34, which are curved, as shown in Fig. 3ᵇ, so that they can embrace the ring, is imparted by the cam-roller 2, which is for this purpose provided with two diametrically arranged projecting cams 35, 35′. These cams act upon sliding rods 36, 36′ provided at their ends with teeth 37, forming racks, which mesh with toothed pinions 38, 38′ mounted on the vertical portions of the thread-laying arms. By the alternate movement of the racks 36, 36′ which is caused by the cams 35, 35′, the arms 33 and 34 are alternately swung around diametrically opposite points on the ring 14; but when the cams release the rods the said arms are brought back to their normal positions by the action of the springs 39, the ends 33′ and 34′ of said arms during their normal positions occupying recesses in the rail 13, as shown in Figs. 1ᵇ and 3ᵇ. Prior to the action of the thread-laying arm, the running thread is pulled out by the thread-stretcher, and the part of the thread which has been pulled out is, afterward, seized by the swinging arm 33 or 34 which lays the thread. The thread-stretchers, or means for putting the thread under tension or for "stretching" the thread, comprise swinging arms 40 and 41 which are arranged under the shuttle-track close to the thread-laying arms and which have pins 40′, 41′ projecting into the path of the shuttle-thread (Figs. 3ᵇ and 4). The arms 40, 41 are connected by rods 42, 42′ with sliding bars 43, 43′ which are alternately operated by cams 44, 44′ of the cam-roller 2. After the thread-stretcher has performed its swinging movement, actuated by the cam 44 or 44′ which moves the bar 43 or 43', the said thread-stretcher 40 or 41 returns to its original position under the influence of a spring 45, the pin 40' or 41' occupying a recess in the rail 13. The hook of the needle 15 moves in the plane of the running thread while the needle is moving forward, and shortly before reaching the end of its movement it makes a quarter-revolution which turns the hook transversely to the thread in order to enable it to seize the thread during its return-movement. Further revolution is imparted to the needle during said return movement in order to bring the loop into the proper position for the passage of the shuttle. This turning movement of the needle is achieved by the arrangement of a curved groove 46 (Figs. 1ª and 3ª) in the shaft 17, which groove is engaged by a pin 47. The groove consists of two longitudinal parts, arranged diametrically opposite to each other, and connected at their rear ends by a curved part, as shown in Figs. 1ª and 3ª. When the needle 15 is drawn back, the pin 47 is, as shown in Fig. 3ª at the one end of the groove 46, and while advancing, the needle remains stationary, in consequence of the axially extending part of the groove, but as the needle reaches the end of its movement it is turned through 90° by the engagement of the pin with the curved part of the groove. In order to prevent the needle from being turned back, the pin, as soon as it arrives at the turning point of the groove 46, is pushed into the other half of the curved part thereof, so that the dead-point is overcome and, when the needle commences its return movement, another revolution of 90° is imparted to it.

For this purpose the pin 47 is arranged on a plate 48 which is slidable transversely of the needle, the ends of the plate 48 being engaged by bell-cranks 50, 50' turning on pins 49, the free ends of the bell-cranks being operated by lateral horns or projections 51, 51' on the cams 44, 44', the projection which comes into action being that on the cam that is just actuating the thread-stretcher. The next forward-movement of the needle turns the same by the action of the groove 46 in the opposite direction, and when the end of the forward movement is reached, the other horn 51 or 51' comes into action and shifts the pin 47 in the other direction beyond the dead-point, whereby the needle is again turned on its return movement, so that the needle makes a revolution of 180 degrees backward and the hook resumes its original position. At the end of each second quarter-revolution of the needle the hook thereon is turned so that, after the loop has been formed and closed by the passing thread of the shuttle, the hook is situated on the side of the needle which is away from the shuttle, and in this position of the needle, the loop is stripped off the hook by a stripper. The stripper consists of a pin which is mounted on a disk 53 and swings around the hook. Connected with this disk is a pinion 54 which is engaged by a rack 55. On this rack is a flat spring 56 which has at both ends, on its upper surface, beveled off-sets or inclines 57, 57'. The latter coöperate with a projection 58 provided on the arm 9 which projects from the base of the sliding carriage 10. In the end position of the shuttle shown in Figs. 3ᵇ and 7 the projection 58 is in front of the right hand off-set 57' of the spring 56, and when the shuttle moves into the other end position the spring and with it the rack 55 is caused to follow, thereby turning the pinion 54 and disk 53 and stripping, by means of the pin 52, the loop from the needle. As soon as this is done, a piece 60 which penetrates through a recess in the guide piece 59 and connects the spring 56 with the rack 55, is stopped by engagement with the left-hand edge of the recess, so that the rack cannot proceed any farther. During the continued movement of the lever 6, the nose 58 slides over the off-set 57' of the spring 56, and when it reaches the other end position of the shuttle, it engages the other off-set 57, whereby upon the return movement of the shuttle, the above described procedure is repeated and the rack moves in the opposite direction until stopped by the right hand end of the recess in the part 59, the projection 58 then again engaging the offset portion 57'.

The shuttle which, for facilitating the engaging of the loops, is provided with points 12, at its ends, is in its reciprocating movement driven by the heads 11' of the shuttle-carriage 11. However, to prevent the loop from being caught between said heads and the shuttle, when the latter is passing through a loop, the following arrangement is provided: Between the shuttle 12 and its carriage 11, or the head 11' thereof, a certain space is provided. The shuttle-carriage has on each of its ends arms 62, 62' pivoted at 61 and having their ends located between the shuttle and the heads 11' of the carriage. At their upper ends the arms are connected by a tension spring 63 by which the arms are held vertically and bearing against the end-walls. In its advancing movement, the shuttle is driven by the rear head 11' of the carriage, while, in front between the shuttle and the other head 11', a free space is left through which the loop caught by the point of the shuttle can slip. Shortly prior to reaching its end position, however, the rear arm 62 or 62' comes in contact with, and is swung by one of two stops 64, 64', and the shuttle is thereby shifted in its direction of movement relatively to the shuttle-carriage 11, by the swung arm, so that, as shown in Fig. 4, a free space is obtained between the rear head 11' and the shuttle 12, through which the loop can slip easily, on the return movement of the shuttle.

As it is intended according to this invention to arrange the thread on the ring radially, like the spokes of a wheel, and since, after this has been done, the middle of the ring-opening is obstructed for the passage of the needle in order to form the next layer of radially arranged thread, the ring is given, for each loop, a reciprocating movement in a horizontal direction, so that the needle can penetrate alternately near the inner rim on one or the opposite side of the ring in order to pull the loop out. For this purpose, the device which holds the ring is arranged on a sliding carriage 65 (Figs. 1ᵇ and 2ᵇ) which moves transversely to the needle and parallel with the shuttle-track. The reciprocating movement of the sliding carriage is imparted by the above mentioned cam-groove 4 of the cam-roller 2, in which groove is arranged a roller 67 on a crank 66. The crank 66 is mounted on a shaft 68 the other end of which is provided with a crank 69 connected with the sliding carriage 65. The ring is shifted by the rotation of the cam-roller 2, a distance equal to the interior diameter of the ring opening, so that the needle alternately passes therethrough, near the inner rim, at diametrically opposite points, seizing the thread which is stretched across the opening on the side of the ring away from the needle.

Figure 9:
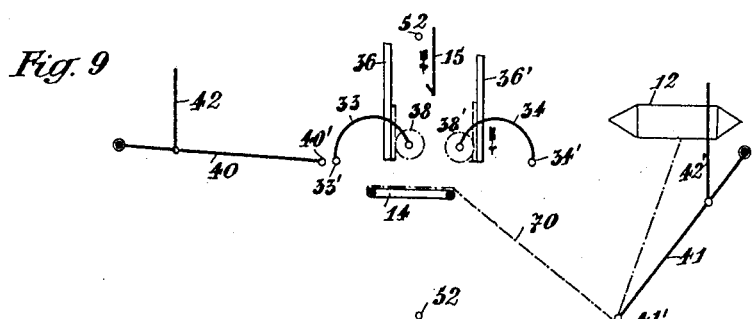
Figure 10:
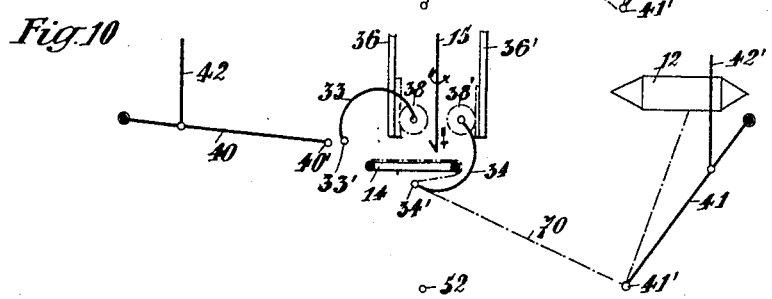
Figure 11:
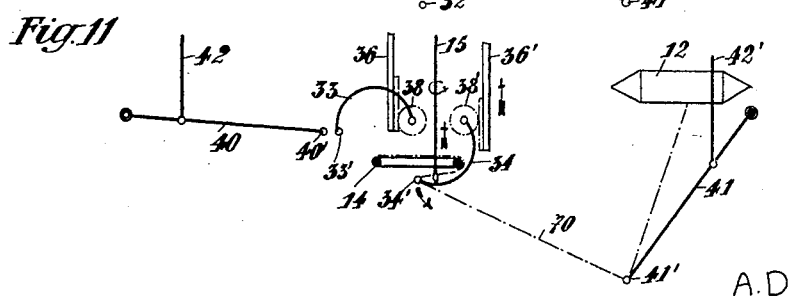

The operation of the above described part of the machine is as follows: In the phase of the operation illustrated in Figs. 3ᵇ and 8, the shuttle stands in its right hand end position, which it has reached after having closed a loop at the left of the ring 14, which was shifted to the left of the needle 15. Now, the right hand thread-stretcher 41 is swung outwardly to take up slack of the thread 70 as shown in Fig. 9 and thereafter the right-hand thread-laying arm 34 comes into action, seizing the stretched thread 70 and pulling it in the form of a loop around the right-hand outer rim of the ring and for a short distance behind the opening thereof, (Fig. 10). Meanwhile, the hooked needle 15 has moved forward through the opening of the ring near the right-hand inner rim, and as soon as the hook has passed by the thread which is behind the ring, the needle makes a rotation of 90°, so that this part of the thread is placed in front of the hook with the latter transversely thereof (Fig. 1ᵇ). When the needle moves backward it receives another rotation of 90° seizes the thread and takes it along forming a loop which is pulled into the range of the shuttle track (Figs. 12 and 13), and the running thread is released from the thread-laying and stretching arms 34 and 41. The shuttle 12 is now moved and its left-hand point 12' passes through the loop, which has been brought into proper position by the rotation of the needle, thereby locking the loop, and simultaneously, the loop is released from the hook for the needle by the stripper 52 swinging in the direction as indicated by the arrow (Fig. 13). During this movement of the shuttle, the ring is shifted to the right, so that the needle, when it advances the next time, makes its stitch near the left-hand inner rim of the ring. The above described operations are at the left of the ring now repeated, the thread-stretcher 40 at the left finally locking the loop which has been formed around the body of the ring at the right, whereupon the thread-laying arm 33 at the left pulls the running thread 70 in form of a loop behind the ring-opening, and the needle after having made a quarter-revolution in the opposite direction again seizes the thread of the loop and pulls it into the range of the shuttle, which on its return movement slides with its right-hand point through the loop, the latter after having been released from the needle by the stripper 52, now rotating in opposite direction, being tightened by the thread-stretcher 41 at the right. The ring is then again shifted to the left and the running thread laid around the ring-body at the right, as described.

For the purpose of laying parallel threads across the opening of the ring, the ring is moved in a direction transverse to the thread each time a thread has has been laid, and after a layer of parallel threads has been finished, the ring is turned through a predetermined angle depending upon the number of layers of parallel threads which are to be laid across the ring. The two movements of the ring are obtained by the following arrangement.

The ring 14 around which the thread is to be spun, rests upon a saddle-shaped support 71 (Fig. 6) and is held in vertical position by two jaws 72, 72', which are arranged on a cross bar 73 connected with a flat casing 74, open on the front for holding a series of rings. The casing or frame is movable in a vertical direction on a supporting plate 75, and presses the jaws 72, 72' against the ring 14 which is in working position, under the action of a spring, 77, connected at one end with the plate 75 and at the other end with a cross-piece 76 on the frame 74. The supporting plate 75 is formed in one with the sliding carriage 65 which effects the horizontal reciprocating movement of the ring 14, so that the ring-support 71 and ring-magazine 74 together partake of said reciprocating movement. The saddle 71 for the ring 14 is movable vertically between lateral guide-pieces 79, 79', being provided on its lower side with a stem 80 which rests upon a cross-bar 81 movable in a vertical direction in a recess in the base-frame 20. The stem extends through a hole in the sliding carriage 65 and through a slot 82 in the track 83, thereby allowing the reciprocating movement of the ring-support, the stem 80 sliding on the cross-bar 81 during this movement.

The cross bar 81 which in its vertical movement is guided by the walls of the recess, and which is acted upon by compression springs 84, has on its under side a yoke 85 which is engaged by an incline 86 Fig. 1ᵇ. The incline 86 is formed on a bar 87 which is guided on the base-frame 20 of the machine and is equipped with a rack 88, which is engaged by a pawl 89 pivoted to the end of a slidable rod 90. The other end of the rod 90 is bent at a right angle, Fig. 1ᵃ, and is acted upon by two cams 91, 91′ of the cam-roller 2. After a thread is laid on the ring, one of the cams comes into contact with the upturned end of rod 90 and moves the latter a certain distance forward, which movement by means of the pawl 89 is transmitted to the rack bar 87. In its advanced position the rack bar 87 is engaged by another pawl 92 pivoted close to the first mentioned pawl 89, on the base-plate 20, while the sliding rod 90 together with the pawl 89, returns to its original position under the action of the tension-spring 93, as soon as the cam disengages from the rod. On the forward-movement of the rack bar 87, the yoke 85 and the cross bar 81 are moved downwardly by the action of the incline 86 on a roller 94 arranged in the yoke and against the action of the springs 84. The ring support 71 and the ring 14, follow said downward movement under the action of the springs 77, so that the next thread is laid beside the one previously laid.

In order to obtain an exact and uniform arrangement of the threads relatively to each other, the upright-plate 75 carries at both sides of the ring-support two spring pressed arms 95, 95′ the inwardly-bent ends of which are spaced a small distance from the guide pieces 79, 79′. The running thread caught by the arms 33, 34, in order to be laid around the ring, is in the thread-laying movement guided by the arms 95, 95′ into the space between the ends of the arms and the guide pieces 79, 79′ so that the thread is always laid across the ring immediately below the ends of arms 95, 95′ and the threads are always laid at equal distances from each other.

After a certain number of threads have been laid across the ring depending upon the number of layers of threads which are to be laid in various directions, the ring is released for a moment from the jaws 72, 72′ and according to said number of layers of threads the ring is turned through a certain angle which, for instance, in the case of 3, 4 or 6 layers will be 60°, 45° or 30°.

The mechanism for releasing the ring and turning it is as follows:—On the back of the plate 75 is arranged a vertically sliding plate 96 having an arm 97 carrying a roller 98, which bears against a cam-disk 99 journaled in the plate. The sliding plate 96 carries at both sides short arms having pins 100, 100′ which engage the jaws 72, 72′ Formed in one with the cam-disk 99 is a disk 101, having radial pins or arms, and axially movable in the hub of the cam disk 99 are two rods 102 which are connected with a round knob 103. The fork or rods 102 and the knob 103 are normally held in outer position, away from ring 14 by a compression-spring 104, with the knob 103 in the path of a cam 106, and the radial pins of the disk 101 are in the path of a cam 105, both of said cams 105, 106, being mounted on a rotating shaft 107.

After a layer of parallel threads is finished the pins 100, 100′ are in contact with inclines 108 of the jaws 72, 72′ due to the downward movement of the jaws with the ring 14. If now the shaft 107 is turned the cam 106 first engages the knob 103, whereby the rods 102 are moved toward the ring 14 and into the opening thereof, and then the cam 105 engages one of the radial pins of the disk 101, so that the latter and also the cam-disk 99 are turned. One of the cams of said disk 99 engages the roller 98 of the sliding plate 96, so that the plate and together with it the pins 100, 100′ are raised, the latter bearing against the inclines 108 of the jaws 72, 72′, and swinging said jaws outwardly to release the ring to allow the same to be turned. When the rods 102 move forwardly, they engage the layer of threads which covers the opening of the ring at diametrically opposed points and turn the ring under the action of the disk 101, through a certain angle in this case 90°, whereafter the roller 98 engages a recess in the cam-disk 99, so that the jaws 72, 72′ are released from the pins 100, 100′ and move toward each other to again grip the ring.

After this has been done, the pawl 89 which effects the intermittent lowering of the ring 14, is disengaged, so that the rack 87, 88 and with it the ring 14 return to their original positions, whereupon the laying of threads across the ring is continued in the new direction.

The release of the pawl 89 is effected by a cam 108ˣ mounted on the shaft 107, the cam engaging one arm of a double lever 109, the other arm of which engages an arm of a second double-arm lever 110. The other arm of the latter, which is slotted, engages a pin 111 on the pawl 92, which pawl is connected with the pawl 89 by a pin 112 on the latter engaging a slot in the pawl 92. Consequently, both pawls are released at the same time by the levers 109, 110 actuated by the cam 108ˣ, whereupon the rack bar 87 under the action of the spring 113, and the ring-support 71 and the ring 14 under the action of the springs 84 are returned to their original positions.

When the ring is completely covered with threads, in several layers, the roller 98 of the sliding plate 96 is engaged, on the next movement of the cam-disk 99, by a higher cam 114 so that the jaws, in consequence of the greater movement of the pins 100, 100', swing farther out, taking with them the arms 95, 95', so that the ring is completely released. During the movement of the cam-disk 99 the rods 102 are moved forwardly, and pass through the layers of threads and the completely released ring is carried along on the rods during their backward movement and is then stripped off the same by the front wall of the hub of the cam-disk, whereafter it eventually drops into a reservoir. Then the rings in the casing or magazine 74 move downwardly and the lowest ring is gripped by the jaws 72, 72', which hold it for a repetition of the above described procedure.

During the turning movement of the ring the sewing or laying of the threads is interrupted, and for this purpose an automatic throw-out clutch is provided which stops the cam-roller at the proper moment, but couples the shaft 107 with the drive-shaft to effect the said turning movement, and after this has been done the clutch is again moved to uncouple shaft 107 and again couple the drive shaft with the cam-roller. The clutch consists of a member 115, mounted to slide on a shaft 1 and connected with it by a feather, and provided on both sides thereof with teeth which intermesh on one side with teeth on the cam-roller 2, which is loosely mounted on shaft 1, and on the other side with teeth on bevel-gear 116 also mounted loosely on the shaft. This gear intermeshes with a second gear 117 mounted on a shaft 118, the other end of which is connected by bevel gears 119, and 120 with the cam-shaft 107. The slidable member of the clutch is formed on its outer face as a spur gear 121 which intermeshes with a larger exchangeable spur gear 122. The dimensions of the latter with respect to the toothed wheel 121 are such, that it makes one revolution while a layer of parallel threads is being laid. The gear 122 is provided with a cam 123 which acts upon a lever 125 influenced by a spring 124 and this cam, as soon as the layer of threads is finished, engages the roller 126 on the lever 125 and shifts the member 115 away from the cam-roller 2 toward the gear 116, so that the cam-roller is stopped, while the cam shaft 107 is rotated by the driving shaft. The length of the cam 123 is such that it maintains shafts 1 and 107 coupled during the time which is necessary for the turning of the ring, whereupon it disengages from the shifting lever 125, which returns into its original position, under the action of the spring 124, and again couples the cam-roller 2 with the drive shaft 1.

It is practical to arrange a number of machines in a battery coupled together, and in order to use one clutch device for all of the machines, only that cam-roller 2 which is nearest to the clutch number 115 is loosely mounted on the driving shaft 1, this roller being connected with the other rollers by a rigid connecting member such as the hollow shaft 127 which surrounds the shaft, 1. Further, the cam shaft 107 will be common to all of the machines having at each machine the necessary shifting cams, so that by means of the clutch device all of the rollers are started and stopped simultaneously and also the turning of all of the rings is effected simultaneously.

If only the body of the ring is to be covered with the thread, the machine only has one threaded-laying arm, while the ring is rotated intermittently. The thread-laying arm lays the loops one after the other in one direction behind the opening of the ring and the hooked-needle seizes the thread thus laid and pulls it in the form of a loop into the range of the shuttle, whereby when the loops are locked by the running thread they are arranged side by side on the body of the ring.

I claim:—

1. In a machine for securing threads around rings, an organized mechanism comprising a hooked needle, a reciprocating shuttle and a stripper, said needle shuttle and stripper being mounted at one side of the ring position, and means for moving the ring.

2. In a machine for securing threads around rings, an organized mechanism comprising a hooked needle, a reciprocating shuttle; said needle and shuttle being constructed and arranged to operate at one side of a ring, stretching means for pulling the running thread out of the shuttle, and means for seizing the thread and laying the same around the outer rim of the ring and across the ring-opening on the ring side remote from the needle to enable the needle on its forward movement to seize the thread and pull the same into the path of the shuttle in the form of a loop, and to lock the loop.

3. In a machine for securing threads around rings, an organized mechanism comprising a hooked needle, a reciprocating shuttle; said needle and shuttle being constructed and arranged to operate at one side of a ring, stretching means for pulling the running thread out of the shuttle, and means for seizing the thread and laying the same around the outer rim of the ring and across the ring-opening on the ring side remote from the needle to enable the needle on its forward movement to seize the thread and pull the same into the path of the shuttle in the form of a loop and to lock the loop; the thread-stretching means and the thread-laying means being duplicated and being arranged with the ring between one thread stretching means and one thread laying means and the other thread stretching means and thread laying means, and the thread laying means being constructed and arranged to lay the running thread across one side and then across the other side of the ring, around the edge and across the opening of the ring.

4. In a machine for securing threads around rings, an organized mechanism comprising a hooked needle and a reciprocating shuttle constructed and arranged to operate at one side of a ring; the needle having teeth on its spindle, a shaft, and a toothed sector movable by the shaft and intermeshed with the teeth on the needle spindle.

5. In a machine for securing threads around rings, an organized mechanism comprising a hooked needle and a reciprocating shuttle constructed and arranged to operate at one side of a ring; the needle having teeth on its spindle, a shaft, a toothed sector fixed on the shaft and intermeshed with the teeth on the needle spindle, a pinion fixed on said shaft, a drive shaft, and a rack intermeshed with said pinion and connected with and arranged to be reciprocated by the drive shaft.

6. In a machine for securing threads around rings, an organized mechanism comprising a hooked needle and a reciprocating shuttle constructed and arranged to operate at one side of a ring; the needle having teeth on its spindle, a shaft, a toothed sector fixed on the shaft and intermeshed with the teeth on the needle spindle, a pinion fixed on said shaft, a drive shaft, a rack bar intermeshed with said pinion and having a slotted end portion receiving the drive shaft and provided with lugs, a cam roller connected with and adapted to operate the shuttle, and means on the drive shaft for coöperating with said lugs to reciprocate the rack bar.

7. In a machine for securing threads around rings, an organized mechanism comprising a hooked needle, a reciprocating shuttle; said needle and shuttle constructed and arranged to operate at one side of a ring, and the needle in its reciprocating movement being rotatable about its axis, and a cam and a pin coöperating therewith for rotating and controlling the needle to hold the hook thereof, on the forward movement of the needle, in the plane of the running thread, cause the needle to make a rotation of 90° shortly before reaching the end of its movement in order to seize the running thread, and cause the needle to make another rotation of 90° when returning to give the loop which has been pulled out proper position for the passage of the shuttle and to cause the needle to make the same rotating movement but in the opposite direction during the next phase of work.

8. In a machine for the purpose described, the combination of a reciprocatory needle having a spindle provided with two diametrically opposite longitudinal grooves and a curved groove connecting the rear ends of the longitudinal grooves, means for reciprocating the needle, and a movable pin arranged to engage the said grooves of the needle spindle, whereby the needle on its forward movement is held against rotation but during the change of stroke is rotated through an angle of 180° and afterward on the return movement is again held against rotation.

9. In a machine for the purpose described, the combination of a reciprocatory needle having a spindle provided with two diametrically opposite longitudinal grooves and a curved groove connecting the rear ends of the longitudinal grooves, means for reciprocating the needle, a pin arranged to engage the grooves of the needle spindle, a slidable member movable transversely to the needle and carrying said pin, a cam roller, cams thereon, and connecting links for shifting the slidable member first in one direction and then in the other according to the direction of the rotation of the needle.

10. In a machine for securing threads around rings, an organized mechanism comprising a hooked needle, a reciprocating shuttle; said needle and shuttle being constructed and arranged to operate at one side of a ring, stretching means for pulling the running thread out of the shuttle, thread laying arms pivoted under the shuttle path and having upturned ends projecting into the path of the thread, and cams and connecting links for actuating said arms so as to cause the same to swing around opposite points of a ring.

11. In a machine for securing threads around rings, an organized mechanism comprising a hooked needle, a reciprocating shuttle; said needle and shuttle being constructed and arranged to operate at one side of a ring, stretching means for pulling the running thread out of the shuttle, thread laying arms pivoted under the shuttle path and having upturned ends projecting into the path of the thread, cams and connecting links for actuating said arms so as to cause the same to swing around the sides of a ring, pinions on the pivotal portions of said arms, reciprocating racks engaging said pinions, and means whereby said racks are reciprocated.

12. In a machine for securing threads around rings, an organized mechanism comprising a hooked needle, a reciprocating shuttle; said needle and shuttle being constructed and arranged to operate at one side of a ring, swinging thread-stretching arms and thread-laying member arranged under the shuttle path, the arms being constructed to alternately swing against the thread and, after the loop has been locked, stretch the running thread and thereby tie the loop, and the said thread-laying members being constructed and arranged to seize the thread and lay the same around the outer rim of the ring and across the ring-opening on the ring side remote from the needle.

13. In a machine for securing threads around rings, an organized mechanism comprising a hooked needle, a reciprocating shuttle; said needle and shuttle being constructed and arranged to operate at one side of a ring, swinging thread-stretching arms arranged under the shuttle path beside thread - laying members and constructed to alternately swing against the thread and, after the loop has been locked, stretch the running thread and thereby tie the loop, cams and connecting links for effecting the rotary movement of the said arms, and the said thread-laying members constructed and arranged to seize the thread and lay the same around the outer rim of the ring and across the ring-opening on the ring side remote from the needle.

14. In a machine for securing threads around rings, an organized mechanism comprising a hooked needle, a reciprocating shuttle; said needle and shuttle arranged to operate at one side of a ring, and a stripper constructed and arranged to go into action after the needle returns to its normal position and to swing around the needle so as to strip the loop off the hook.

15. In a machine for securing threads around rings, an organized mechanism comprising a hooked needle, a reciprocating shuttle; said needle and shuttle arranged to operate at one side of a ring, a carriage in which the shuttle is movable, levers for acting upon the ends of the shuttle, and means for rocking the rear lever, after the shuttle has passed through the loop, so as to impart an additional movement to the shuttle in its direction of motion, whereby it is moved from the rear head of the shuttle carriage so that the loop of thread can slip over the shuttle during the return movement thereof.

16. In a machine for securing threads around rings, an organized mechanism comprising a hooked needle, a reciprocating shuttle; said needle and shuttle arranged to operate at one side of a ring, means for laying the thread in the manner of chords across the ring, a wedge, a ring-support yieldingly pressed against the wedge, a rack carrying the wedge, a pawl engaging said rack, and cams on a cam roller controlling said pawl.

17. In a machine for the purpose described, a stripper pin arranged to be moved in the plane of a loop formed of thread, a gear on which said pin is mounted, a rack engaging said gear, and shuttle driving means for moving said rack so the pin is swung first in one direction and then in the other.

18. In a machine for the purpose described, a movable needle, means for shifting a ring in the direction of the running thread sufficiently to enable the needle to make its stitch first near one point on the ring and then near an opposite point thereon, and alternately seize one or the other loop-forming thread which has been laid across the opening of the ring, and means for so laying the thread.

19. In a machine for the purpose described, ring-turning means, a hooked needle, a pawl, a wedge, a fork, and springs; the said fork being disposed opposite the hooked needle and constructed, after completion of a layer of threads, to pass into the ring opening and engage the threads at diametrically opposite points in order to turn the ring through an angle to properly place it for the next layer of threads, and, after the rod has been withdrawn the pawl is released so that the wedge and ring are returned to their original position under the action of the springs.

20. In a machine for the purpose described, ring-turning means, a hooked needle, a pawl, a wedge, a fork, and springs; the said fork being disposed opposite the hooked needle and constructed, after completion of a layer of threads, to pass into the ring opening and engage the threads at diametrically opposite points in order to turn the ring through an angle to properly place it for the next layer of threads, and, after the rod has been withdrawn the pawl is released so that the wedge and the ring are returned to their original position under the action of the springs, a disk in which said fork is axially movable, a plate in which the disk is journaled, a head on the fork, a cam on a shaft for actuating said head, a cam on the same shaft for afterward turning the disk and fork, and means whereby, after the cam is released from the knob, the fork is returned to its original position, and the pawl is released.

21. A ring holding device having a ring-support, jaws for holding the upper part of a ring, and a ring-magazine connected with said jaws, and a plate; the magazine being vertically movable on the plate so that the jaws together with the magazine follow the upward and downward movements of the ring.

22. A ring holding device having a ring-support, jaws for holding the upper part of a ring and provided with inclined faces, pins arranged between the jaws to engage said faces; said pins being carried on a vertically sliding member arranged back of a plate, a ring-magazine connected with said jaws, and the said plate; the magazine being vertically movable on the plate, and the vertically sliding member having an arm, and a cam disk on which said arm bears.

23. In a ring-holding device, a vertically slidable ring support, guides therefor, a plate, arms on the plate and adapted to yieldingly bear against a ring, and thread-laying members; the said members being guided by the arms to assure uniform and even laying of the threads across a ring.

24. In a machine for securing threads around rings, an organized mechanism comprising a hooked needle, a reciprocating shuttle and a stripper, said needle, shuttle and stripper being mounted at one side of the ring position, means for moving the ring, and thread laying means.

25. In a machine for the purpose described, a plate having a ring holding device, a ring magazine, a sliding carriage connected with said plate and magazine, a carriage track, a stem on the holding device and resting in a slot of the track, a resiliently arranged vertically movable member having a yoke and on which the stem rests, and a wedge engaging said yoke; the stem sliding on said member during the reciprocating movement of the holding device.

26. In a machine for the purpose described, ring holding means, a cam-shaft, cams thereon, means actuated by said cams for turning a ring, a pawl, a third cam on the shaft for releasing the pawl, a main shaft, and means whereby said cam receives intermittent motion from the main shaft.

27. In a machine for securing threads under tension around rings, an organized mechanism comprising a hooked needle, a reciprocating shuttle and a stripper, said needle, shuttle and stripper being mounted at one side of the ring position, means for moving the ring, thread laying means, and thread stretching means.

28. In a machine for securing threads around rings, an organized mechanism comprising a loop-taking needle, a shuttle, ring-moving means, and means for coöperating with the needle and shuttle in laying thread on the ring, said needle, shuttle, and said means for coöperating with the needle and shuttle in laying thread on the ring being mounted at one side of the ring position.

29. In a ring-holding device, ring-holding jaws, arms bearing yieldingly against the jaws and located to the side thereof, a magazine connected with the jaws, and means whereby after a ring is covered with thread, the jaws and arms are moved outwardly to release said ring and to permit the lowest ring in the magazine to assume its place and be gripped by the jaws, in combination with means for stretching the thread during such manipulation.

In testimony whereof I have signed my name to this specification in the presence of two subscribing witnesses.

ING. ADOLF DANGL.

Witnesses:
HERMAN WUNDERLICH,
AUGUST FUGGER.